(12) United States Patent
Hatcher et al.

(10) Patent No.: US 9,352,846 B2
(45) Date of Patent: May 31, 2016

(54) REFUELING BOOM CONTROL SYSTEM

(71) Applicant: The Boeing Company, Chicago, IL (US)

(72) Inventors: Justin Cleve Hatcher, Renton, WA (US); Thomas Edward Speer, Des Moines, WA (US); Jeffrey L. Musgrave, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/834,862

(22) Filed: Aug. 25, 2015

(65) Prior Publication Data

US 2016/0023775 A1    Jan. 28, 2016

Related U.S. Application Data

(62) Division of application No. 13/570,713, filed on Aug. 9, 2012, now Pat. No. 9,132,921.

(51) Int. Cl.
*B64D 39/00*    (2006.01)

(52) U.S. Cl.
CPC ........................................ *B64D 39/00* (2013.01)

(58) Field of Classification Search
CPC .................................. B64D 39/00; G05D 1/00
USPC .......................... 244/135 A, 136, 1 TD; 701/4
See application file for complete search history.

(56) References Cited

U.S. PATENT DOCUMENTS

| | | | |
|---|---|---|---|
| 2,960,295 A | 11/1960 | Schulze | |
| 4,072,283 A | 2/1978 | Weiland | |
| 4,150,803 A | 4/1979 | Fernandez | |
| 7,246,774 B2 | 7/2007 | Von Thal et al. | |
| 7,469,863 B1 | 12/2008 | Speer | |
| 7,472,868 B2 | 1/2009 | Schuster et al. | |
| 7,769,543 B2 | 8/2010 | Stecko et al. | |
| 2005/0090947 A1* | 4/2005 | Wise | G01P 13/025 701/6 |
| 2014/0042274 A1 | 2/2014 | Hatcher et al. | |

FOREIGN PATENT DOCUMENTS

| | | |
|---|---|---|
| EP | 0780292 A1 | 6/1997 |
| EP | 2397405 A1 | 12/2011 |

(Continued)

OTHER PUBLICATIONS

Office Action, dated Dec. 3, 2014, regarding U.S. Appl. No. 13/570,713, 16 pages.
Notice of Allowance, dated May 12, 2015, regarding U.S. Appl. No. 13/570,713, 8 pages.

(Continued)

*Primary Examiner* — Benjamin P Lee
(74) *Attorney, Agent, or Firm* — Yee & Associates, P.C.

(57) ABSTRACT

An apparatus comprising a refueling controller. The refueling controller is configured to receive a number of operator commands for moving a refueling boom on a tanker aircraft in a desired direction. The number of operator commands defines at least one of an azimuth movement and an elevation movement of the refueling boom during flight of the tanker aircraft. The refueling controller is further configured to generate a number of intermediate commands for moving the refueling boom in the desired direction as defined by the number of operator commands. The number of intermediate commands defines at least one of a roll movement and a pitch movement such that the refueling boom moves in the desired direction.

20 Claims, 12 Drawing Sheets

(56) References Cited

FOREIGN PATENT DOCUMENTS

| WO | 2009082400 A1 | 7/2009 |
| WO | WO2010065036 A1 | 6/2010 |
| WO | WO2012030347 A1 | 3/2012 |

OTHER PUBLICATIONS

Notice of Allowability, dated Jun. 12, 2015, regarding U.S. Appl. No. 13/570,713, 3 pages.
Extended European Search Report, dated Jan. 4, 2016, regarding Application No. 13178587.5, 9 pages.

* cited by examiner

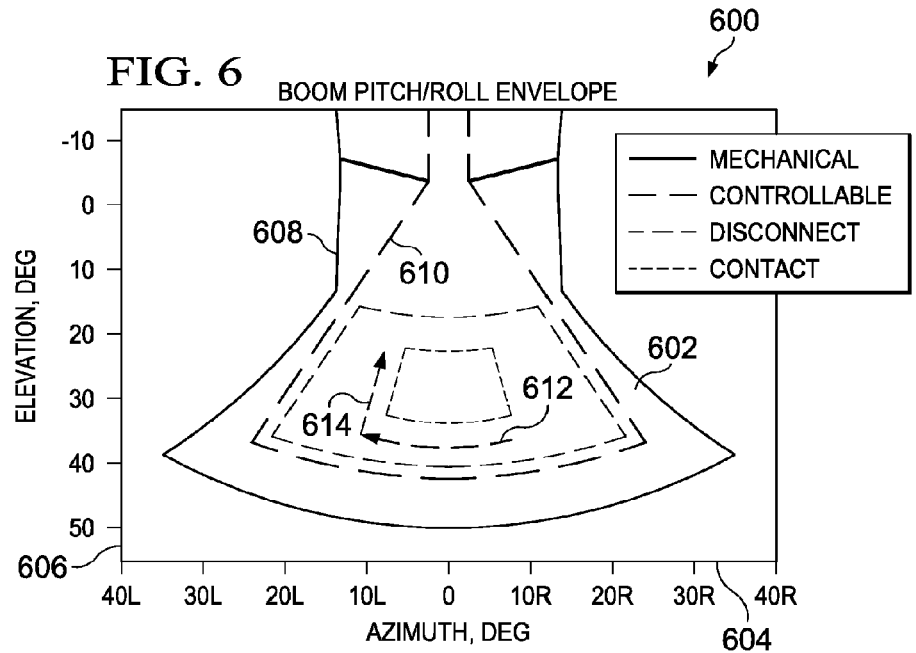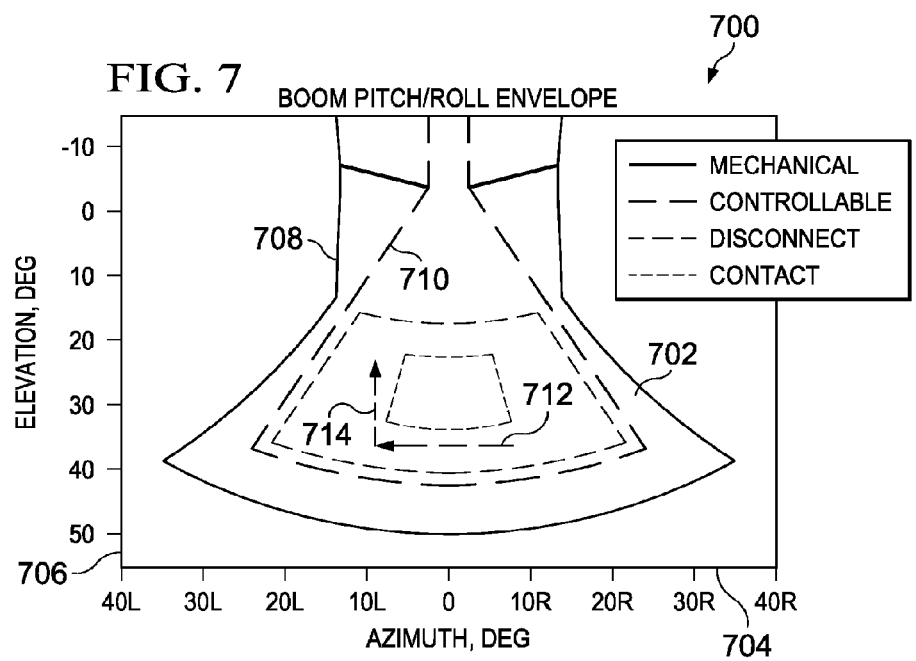

REFUELING BOOM CONTROL SYSTEM

This application is a divisional of U.S. patent application Ser. No. 13/570,713 filed on Aug. 9, 2012, the contents of which are incorporated herein by reference.

BACKGROUND INFORMATION

1. Field

The present disclosure relates generally to aircraft and, in particular, to refueling aircraft. Still more particularly, the present disclosure relates to a method and apparatus for managing movement of a refueling boom for a refueling aircraft.

2. Background

Aerial refueling is the process of transferring fuel from one aircraft to another aircraft during flight. The aircraft from which the fuel originates is referred to as a tanker aircraft. The aircraft receiving the fuel is referred to as a receiver aircraft. This type of refueling process may be applied to various types of receiver aircraft, tanker aircraft, or both receiver aircraft and tanker aircraft. The various types of aircraft may include fixed wing aircraft, rotor wing aircraft, and other suitable types of aircraft.

One common approach for refueling aircrafts during flight involves the use of a refueling boom and a receptacle system. The refueling boom may be comprised of a tube that is fixed on a tanker aircraft or may be a telescoping refueling boom on the tanker aircraft. The refueling boom may be attached to the rear of the tanker aircraft. This refueling boom may move along three axes relative to the aircraft. In some cases, the refueling boom also may be flexible. An operator may extend a refueling boom and also may reposition the refueling boom for insertion into a receptacle on the receiver aircraft. When the end of the refueling boom is inserted into a receptacle of the receiver aircraft, the refueling boom may then be considered to be connected to the receiver aircraft. When a connection is made, fuel may be transferred from the tanker aircraft to the receiver aircraft through the refueling boom.

When the operator moves the refueling boom to make the connection with the aircraft, the operator performs this operation using a control device. This control device may take the form of a control stick. This control stick may be similar to a joystick. The operator moves the control stick in different directions to cause the refueling boom to move in different directions.

Moreover, different tanker aircraft have different types of systems for positioning the refueling boom. As a result, an operator that is trained and experienced with refueling operations in one type of tanker aircraft may not be able to control the refueling boom as easily in another type of tanker aircraft. The different controls and operations performed to move the refueling boom may be different between the different types of tanker aircraft.

In one example, a refueling boom may move about a rotational axis. More specifically, the refueling boom may move about a pitch and roll axis. The operator may move the control stick in a direction to correspond with the desired pitch and roll movement of the refueling boom. This type of input control may be more complicated than desired and may not be as intuitive to a less-experienced boom operator.

Consequently, an operator that works in more than one type of tanker aircraft may need training for the different types of tanker aircraft. As a result, in order to perform refueling operations in different types of tanker aircraft, an operator spends additional time in training and in practicing on different types of tanker aircraft.

This difference in the controls for performing refueling operations may result in more training and expense than desired. Further, if the different operators are not familiar with all the different types of tanker aircraft used, then the operators prepared for performing missions on a particular type of aircraft may not be available as desired. Therefore, it would be desirable to have a method and apparatus that takes into account at least some of the issues discussed above, as well as other possible issues.

SUMMARY

In one illustrative embodiment, an apparatus comprises a refueling controller. The refueling controller is configured to receive a number of operator commands for moving a refueling boom on a tanker aircraft in a desired direction. The number of operator commands defines at least one of an azimuth movement and an elevation movement of the refueling boom during flight of the tanker aircraft. The refueling controller is further configured to generate a number of intermediate commands for moving the refueling boom in the desired direction as defined by the number of operator commands. The number of intermediate commands defines at least one of a roll movement and a pitch movement such that the refueling boom moves in the desired direction.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a graph of a refueling boom envelope in accordance with an illustrative embodiment;

FIG. 7 is another illustration of a graph of a refueling boom envelope in accordance with an illustrative embodiment;

DETAILED DESCRIPTION

Figure 1:
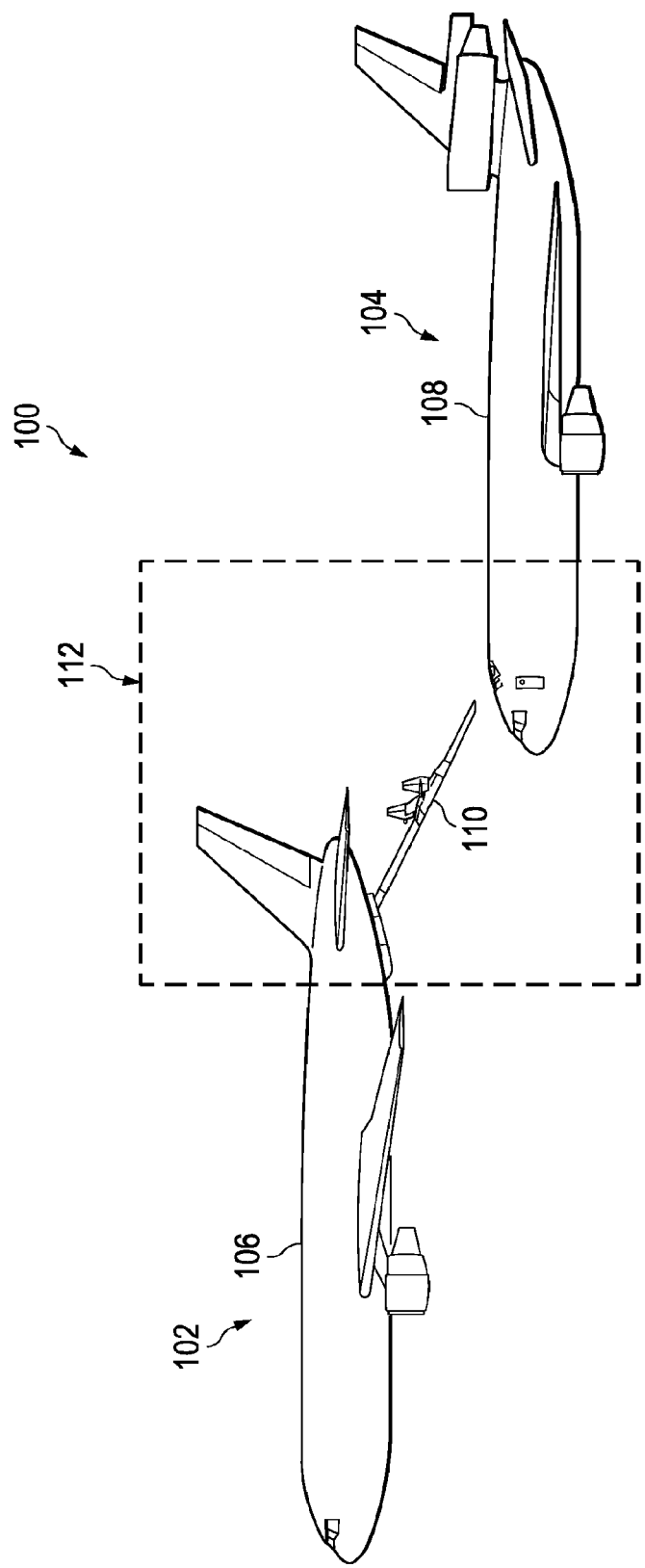
FIG. 1 is an illustration of a refueling environment in which an illustrative embodiment may be implemented.

The different illustrative embodiments recognize and take into account one or more considerations. For example, the illustrative embodiments recognize and take into account that the differences in the controls used to control a refueling boom may increase the difficulty in performing refueling operations with different types of tanker aircraft. Further, the illustrative embodiments recognize and take into account that one control that may be different between different types of tanker aircraft is the manner in which a refueling boom moves in response to a movement of a control stick.

The illustrative embodiments also recognize and take into account that if the operator moves the control stick in one direction, the refueling boom may not always move in the direction that corresponds to the movement of the control stick. For example, the operator may move the control stick to the left. The operator may expect that the refueling boom will move an azimuth direction in the refueling boom envelope. This type of movement, however, may not occur with all types of tanker aircraft. Depending on the type of tanker aircraft, the refueling boom may move with a roll movement and a pitch movement to the left rather than just moving to the left.

This roll movement and pitch movement may be a result of the kinematics of the refueling boom. In other words, the manner in which the refueling boom is moved may be a pitch movement and a roll movement rather than a similar movement to the movement of the control stick in an azimuth direction and/or an elevation direction.

Thus, the operator may need to input commands in the control stick to move the refueling boom along the pitch and roll axis. In this example, moving the refueling boom in the azimuth direction in the refueling environment may take coordinated control stick input by the operator. As a result, the operator adjusts to moving the control stick in a manner that provides for the desired movement.

This adjustment in the way an operator moves the control stick, however, may not be as natural of a feel as compared to a refueling boom that moves in an azimuth direction and an elevation direction that corresponds to movement of the control stick in a left and right or forward and backward direction. Further, this type of roll movement and pitch movement requires additional training and experience as compared to a refueling boom that moves in an azimuth direction and elevation direction in response to a similar movement of the control stick.

Thus, the illustrative embodiments provide a method and apparatus for managing the movement of a refueling boom. One or more illustrative embodiments provide an ability to have refueling booms move in the same direction in different types of tanker aircraft with respect to the same movement of a control stick.

Operator commands generated by control devices are received. The operator commands are for a first type of movement of the refueling boom. Intermediate commands are generated for a second type of movement that causes movement of the refueling boom using the first type of movement.

In another illustrative example, a refueling controller may be configured to receive a number of operator commands for moving the refueling boom on the tanker aircraft in a desired direction. The number of operator commands define at least one of an azimuth movement and an elevation movement of the refueling boom during flight of the tanker aircraft. Further, the refueling controller may generate a number of intermediate commands for moving the refueling boom in the desired direction as defined by the number of operator commands. The number of intermediate commands define at least one of a roll movement and a pitch movement such that the refueling boom moves in a desired direction.

With reference now to the figures and, in particular, with reference to FIG. 1, an illustration of a refueling environment is depicted in accordance with an illustrative embodiment. In this illustrative example, refueling environment 100 includes aircraft 102 transferring fuel to aircraft 104. Aircraft 102 is tanker aircraft 106, while aircraft 104 is receiver aircraft 108.

In these illustrative examples, refueling boom 110 on tanker aircraft 106 is connected to receiver aircraft 108. As depicted, fuel is transferred from tanker aircraft 106 to receiver aircraft 108 through refueling boom 110.

An illustrative embodiment may be implemented in tanker aircraft 106 to manage the movement of refueling boom 110. In particular, one or more illustrative embodiments may be implemented in tanker aircraft 106 to manage the movement of refueling boom 110 in a manner that is more intuitive to an operator of refueling boom 110 in tanker aircraft 106. A more detailed illustration of refueling boom 110 in section 112 is depicted in FIG. 2.

Figure 2:
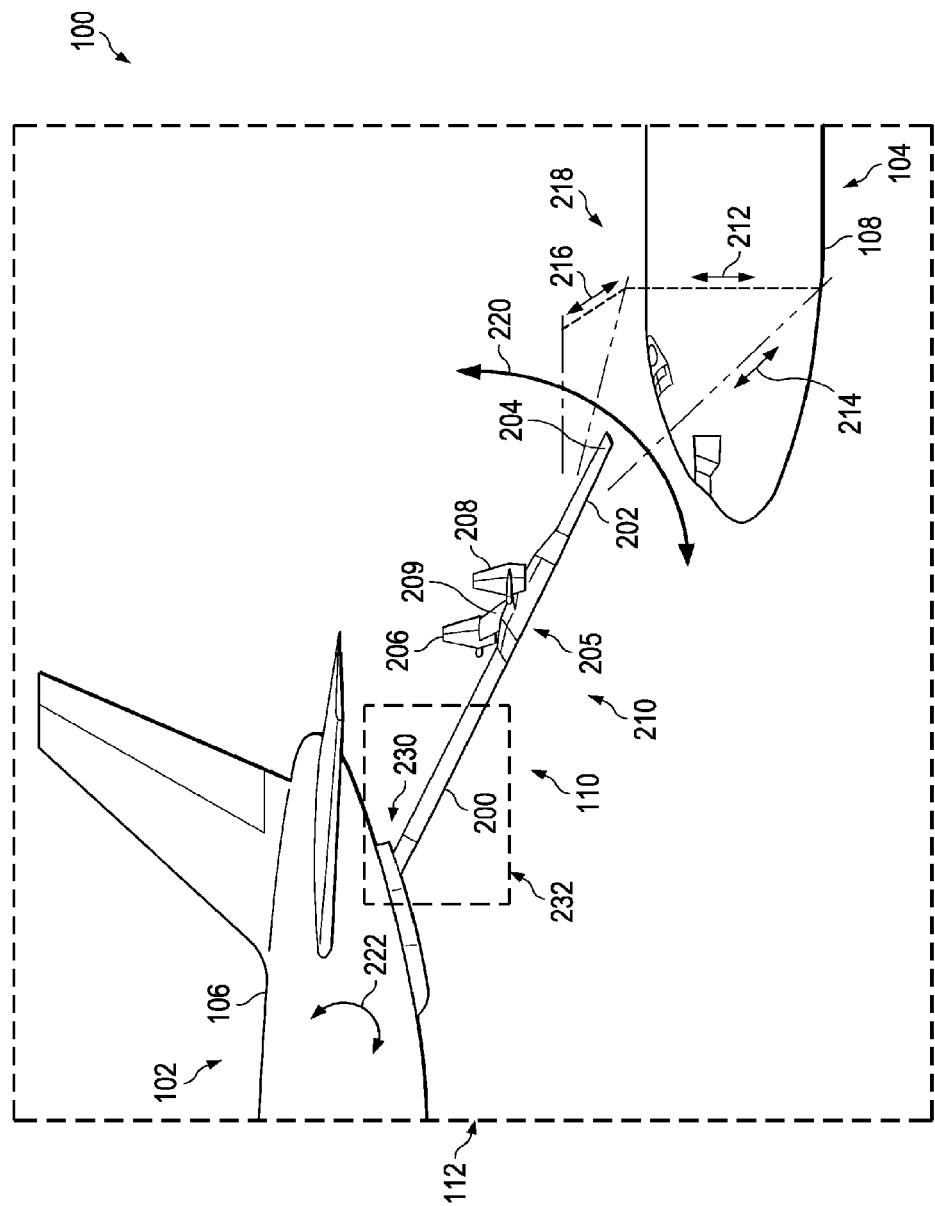
FIG. 2 is a detailed illustration of a refueling boom in accordance with an illustrative embodiment.

With reference now to FIG. 2, a detailed illustration of a refueling boom is depicted in accordance with an illustrative embodiment. In this illustrative example, a more detailed view of section 112 with refueling boom 110 in FIG. 1 is shown.

As depicted, refueling boom 110 includes fixed tube 200, telescoping tube 202, nozzle 204, and control surfaces 205. Fixed tube 200 may also move in an elevation direction as indicated by arrow 212. This type of movement in the elevation direction may be referred to as an elevation movement of refueling boom 110. Arrow 212 may be used to describe movement along a z-axis.

Telescoping tube 202 may extend or retract along the direction of arrow 214. Arrow 214 may be used to describe movement along the refueling boom axis.

Refueling boom 110 also may move in an azimuth direction as indicated by arrow 216. Arrow 216 may be used to describe movement along a y-axis. This type of movement may be referred to as an azimuth movement of refueling boom 110.

The movement of refueling boom 110 in the elevation direction as indicated by arrow 212 and along the azimuth direction as indicated by arrow 216 may be controlled using control surfaces 205. In some illustrative examples, rudder 206, rudder 208, and elevator 209 are control surfaces 205 that control the movement of refueling boom 110. Control surfaces 205 form force generator 210 for refueling boom 110. In other illustrative examples, other control surfaces in addition to or in place of rudder 206, rudder 208, and elevator 209 in control surface 205 may be present to control the movement of refueling boom 110.

The movement of refueling boom 110 also may be performed using roll movement and pitch movement. For example, refueling boom 110 may have a roll as indicated by arrow 220. Additionally, refueling boom 110 also may have a pitch movement as indicated by arrow 222. Control surfaces 205 may be used to control the pitch movement and roll movement of refueling boom 110.

With the illustrative embodiments, the movement of refueling boom 110 along arrow 214, arrow 216, arrow 212, and in other directions may be controlled by the operator in a more intuitive manner. Further, the control of refueling boom 110 may be such that the control device used by the operator moves refueling boom 110 in the same manner with different types of refueling aircraft even though different types of systems for moving refueling boom 110 may be present.

The type of movement that occurs may depend on support structure 230. In other words, depending on support structure 230, refueling boom 110 may move in an azimuth direction and an elevation direction, in a rolling direction and a pitching direction, or in some other manner in response to movement of a control device in tanker aircraft 106.

Of course, although support structure 230 may provide for a type of movement such as a roll movement and a pitch movement, refueling boom 110 may be moved effectively with an azimuth movement and an elevation movement through a more complex movement of the control device. In other words, movement of the control device in first direction may typically provide for a roll movement while movement of the control device in a second direction may provide for a pitch movement.

To obtain an azimuth movement, the illustrative embodiments also recognize that a combination of directions of movement may be required to be input by the operator into in the control device. In this manner, the desired type of movement of refueling boom 110 may be obtained, but with more complex and less natural movements in the control device. In other words, movement of the control device in one direction or another direction may not result in an azimuth movement or an elevation movement in these illustrative examples.

Thus, one or more illustrative embodiments may include mapping commands generated by a control device that are intended for an azimuth movement and an elevation movement into one or more commands that are for roll movement and pitch movement. Mapping commands from the control device to the refueling boom control system may allow an operator to obtain the desired type of movement of refueling boom 110. A more detailed illustration of support structure 230 in section 232 is shown in FIG. 3 below.

In these illustrative examples, the configuration of force generator 210 may affect the manner in which refueling boom 110 may move. In other words, the configuration of force generator 210 may result in different types of movement for refueling boom 110. For example, force generator 210 may cause azimuth movement and elevation movement in some cases. In other cases, force generator 210 may result in roll movement and pitch movement. In this illustrative example, rudder 206, rudder 208, and elevator 209 are configured such that movement of a control device in one direction results in a roll movement and movement of the control device in another direction results in a pitch movement. This type of movement is in contrast to an azimuth movement and an elevation movement for the same type of movement of the control device.

Figure 3:
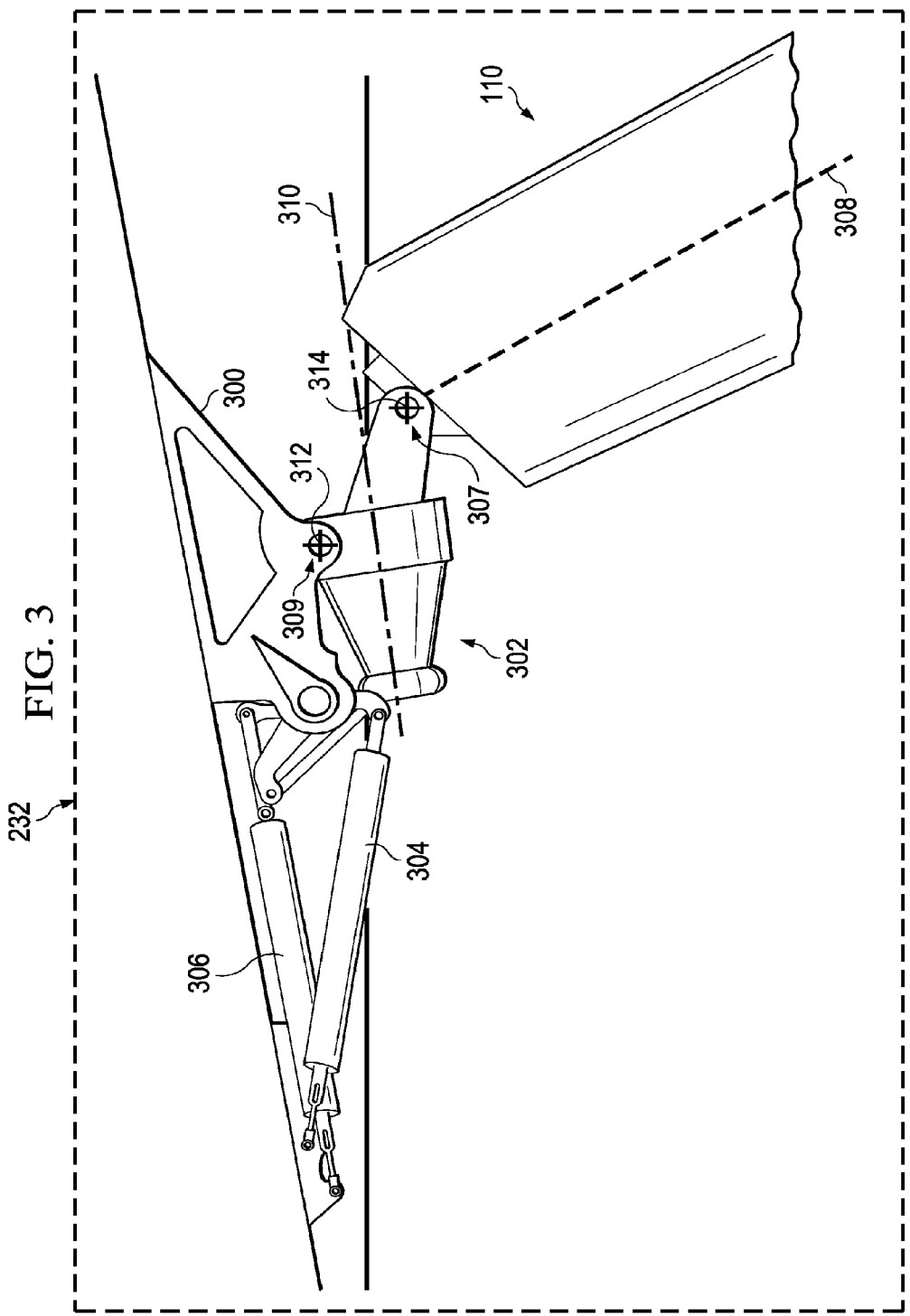
FIG. 3 is a detailed illustration of a support system in accordance with an illustrative embodiment.

With reference now to FIG. 3, a detailed illustration of a support system is depicted in accordance with an illustrative embodiment. FIG. 3 is a more detailed illustration of section 232 from FIG. 2.

In this illustrative example, the support system that supports refueling boom 110 includes boom support fitting 300, gimbal 302, link 304, and link 306. Link 304 and link 306 may provide damping, resistance or both to movements and vibrations of gimbal 302. As depicted, gimbal 302 has a pitching gimbal point 309 and refueling boom 110 has a pitching gimbal point 307. Pitching gimbal point 307 and pitching gimbal point 309 are points about which gimbal 302 and refueling boom 110 move.

In this illustrative example, refueling boom 110 does not roll about boom axis 308. Instead, refueling boom 110 rolls about gimbal axis 310. Gimbal axis 310 extends through gimbal 302 in this illustrative example. Gimbal 302 may rotate about axis 312, while refueling boom 110 may move about axis 314. As refueling boom 110 pitches about axis 314, gimbal 302 does not rotate about axis 312. Similarly, as gimbal 302 rotates about axis 312, refueling boom 110 does not move about axis 314. In this manner, a "double pitch" system is present that allows for movement of either gimbal 302 or refueling boom 110 without the movement of the other structure.

As can be seen, this configuration of support structure 230 provides for roll movement in response to movement of a control device in a first direction and a pitch movement in response to movement of the control device in a second direction. The second direction may be substantially perpendicular to the first direction.

Figure 4:
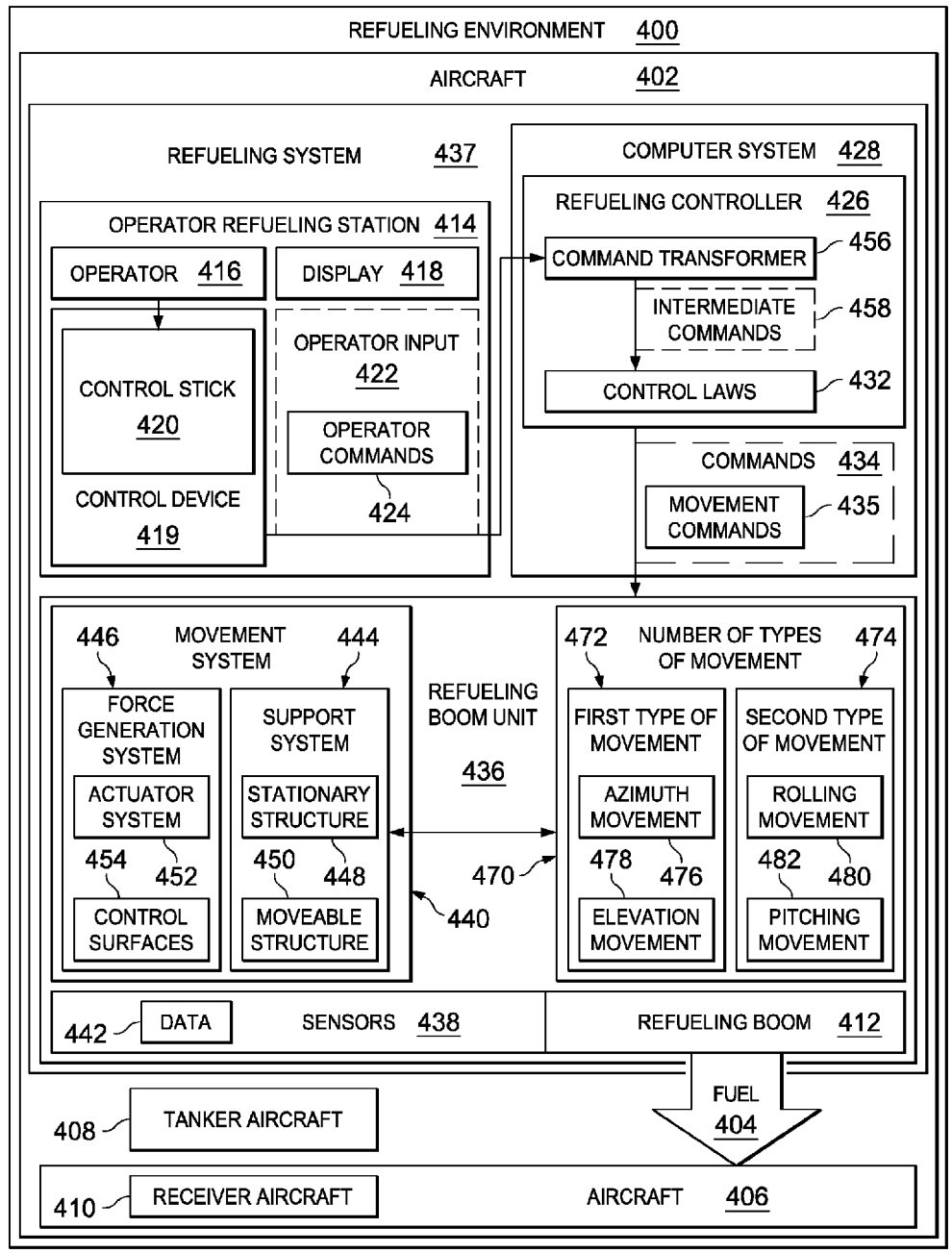
FIG. 4 is an illustration of a block diagram of a refueling environment in accordance with an illustrative embodiment.

Turning now to FIG. 4, an illustration of a block diagram of a refueling environment is depicted in accordance with an illustrative embodiment. The different components in refueling environment 100 in FIG. 1 and in FIG. 3 are examples of one physical implementation for refueling environment 400 shown in block form in this figure.

As depicted, aircraft 402 may provide fuel 404 to aircraft 406. Aircraft 402 is tanker aircraft 408, while aircraft 406 is receiver aircraft 410. In this illustrative example, fuel 404 is transferred from tanker aircraft 408 to receiver aircraft 410 using refueling boom 412.

Operator refueling station 414 provides a location for operator 416 to control refueling boom 412. As depicted, operator refueling station 414 includes display 418 and control device 419. In this illustrative example, control device 419 is a hardware device that is configured to control movement of refueling boom 412. Control device 419 takes the form of control stick 420. Other types of control devices may include, for example, without limitation, a mouse, a keyboard, a joystick, a touch screen, and other suitable types of control devices.

Display 418 is configured to display information about refueling boom 412 as well as other information about the refueling operation to transfer fuel 404 to receiver aircraft 410. Display 418 also may display video images of refueling boom 412 at receiver aircraft 410 to operator 416.

Operator 416 may manipulate control stick 420 to generate operator input 422. In other words, as operator 416 manipulates control stick 420, control stick 420 generates operator input 422. In these illustrative examples, operator input 422 takes the form of operator commands 424.

As depicted, operator commands 424 are received by refueling controller 426. Refueling controller 426 may take the form of hardware, software, or a combination of the two. When software is used, the operations performed by refueling controller 426 may be implemented in program code configured to be run on a processor unit. When hardware is employed, the hardware may include circuits that operate to perform the operations in refueling controller 426.

In these illustrative examples, the hardware may take the form of a circuit system, an integrated circuit, an application specific integrated circuit (ASIC), a programmable logic device, or some other suitable type of hardware configured to perform a number of operations. When software is used a programmable logic device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable programmable logic devices. Additionally, the processes may be implemented in organic components integrated with inorganic components and/or may be comprised entirely of organic components excluding a human being. For example, the processes may be implemented as circuits in organic semiconductors.

As depicted, refueling controller 426 may be implemented in computer system 428. Computer system 428 is one or more computers. When more than one computer is present in computer system 428, those computers may be in communication with each other via a communications medium such as a network.

In these illustrative examples, refueling controller 426 may include control laws 432. Control laws 432 may be implemented as software, hardware, or a combination of the two. As depicted, control laws 432 are configured to control refueling boom 412. The control of refueling boom 412 by control laws 432 may include processing operator commands 424 in operator input 422 received from operator refueling station 414.

In these illustrative examples, refueling controller 426 may process operator commands 424 in operator input 422 using control laws 432 to generate commands 434. In particular, commands 434 may take the form of movement commands 435. Movement commands 435 are sent to refueling boom unit 436. As depicted, operator refueling station 414, refueling controller 426, and refueling boom unit 436 form refueling system 437.

As depicted, refueling boom unit 436 includes sensors 438, movement system 440, and refueling boom 412. In these illustrative examples, sensors 438 are configured to generate data 442 about refueling boom 412. Data 442 may include, for example, without limitation, the configuration of movement system 440, the position of refueling boom 412, images of refueling boom 412, and other suitable information.

In these illustrative examples, sensors 438 may include at least one of an inertial measurement unit, a position sensor, an accelerometer, a load sensor, a global positioning system device, and other suitable devices. In some illustrative examples, one or more of sensors 438 may be associated with refueling boom 412.

In these illustrative examples, movement system 440 is configured to control movement of refueling boom 412. As depicted, movement commands 435 are used by movement system 440 to move refueling boom 412.

In this illustrative example, movement system 440 includes support system 444 and force generation system 446. Support system 444 includes physical structures used to support refueling boom 412. Support system 444 may include stationary structures 448 and moveable structures 450. These structures support and allow for movement of refueling boom 412.

The movement of refueling boom 412 may be caused by force generation system 446. In this illustrative example, force generation system 446 may include at least one of actuator system 452, control surfaces 454, and other suitable components.

Actuator system 452 is one or more actuators configured to cause movement of refueling boom 412. This movement may be caused directly or indirectly. For example, actuator system 452 may cause movement of refueling boom 412 indirectly by causing movement of moveable structure 450 in support system 444.

Control surfaces 454 include one or more control surfaces that may be associated with refueling boom 412. The position of these control surfaces may cause movement of refueling boom 412. Control surfaces 454 may include, for example, at least one of a flap, an elevator, a ruddevator, a rudder, and other types of control surfaces.

Depending on the design of movement system 440, the type of movement provided by movement system 440 may vary. In these illustrative examples, movement system 440 may provide for number of types of movement 470. For example, number of types of movement 470 provided by movement system 440 may include first type of movement 472 and second type of movement 474.

First type of movement 472 may include azimuth movement 476 and elevation movement 478. Second type of movement 474 may include rolling movement 480 and pitching movement 482.

In these illustrative examples, the type of movement generated by movement system 440 depends on the configuration of at least one of support system 444 and force generation system 446 in movement system 440. In these illustrative examples, the type of movement provided is the movement that occurs when control device 419 is moved in one direction.

For example, movement system 440 may provide movement in directions with azimuth movement and elevation movement. In other examples, other configurations of movement system 440 may provide movement in directions with roll movement and pitch movement. Of course, still other types of movement may be provided depending on the configuration of movement system 440.

Depending on the type of movement provided by movement system 440, movement of refueling boom 412 may not be as intuitive for operator 416 as desired. For example, operator 416 may move control stick 420 in one direction that corresponds to azimuth movement from the perspective of operator 416.

However, operator commands 424 may result in movement system 440 moving in a direction with a roll movement. More specifically, refueling boom 412 may first have a roll movement rather than an azimuth movement. The roll movement of the refueling boom does not correspond to the movement of control stick 420 in the azimuth direction.

Movement commands 435 are generated in a manner that makes movement of control device 419 and the movement of refueling boom 412 more intuitive or easier for operator 416. In these illustrative examples, command transformer 456 is present in refueling controller 426. Command transformer 456 may be implemented using hardware, software, or a combination of the two. Command transformer 456 is configured to transform operator commands 424 generated by control stick 420 into intermediate commands 458.

Intermediate commands 458 result in commands 434 that cause refueling boom 412 to move in a direction that substantially corresponds to the direction of movement of control device 419. In particular, the movement of refueling boom 412 may move in a manner that corresponds to movement of control stick 420 when moved by operator 416 in these illustrative examples.

The illustration of refueling environment 400 and the different components in refueling environment 400 in FIG. 4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In another illustrative example, control stick 420 may be moved in other directions other than left, right, forward, and backward. In other words, control stick 420 may be moved in directions other than a first direction and a second direction that is substantially perpendicular to the first direction. For example, control stick 420 also may be moved in a diagonal direction. This diagonal direction may be 45 degrees from the first direction, the second direction, or both. This type of movement results in a combination of azimuth and elevation commands being generated.

In yet another illustrative example, refueling system 437 may include additional components in addition to operator refueling station 414, refueling controller 426, and refueling boom unit 436. In some illustrative examples, refueling boom 412 may also include fuel tanks that store fuel 404.

Figure 5:
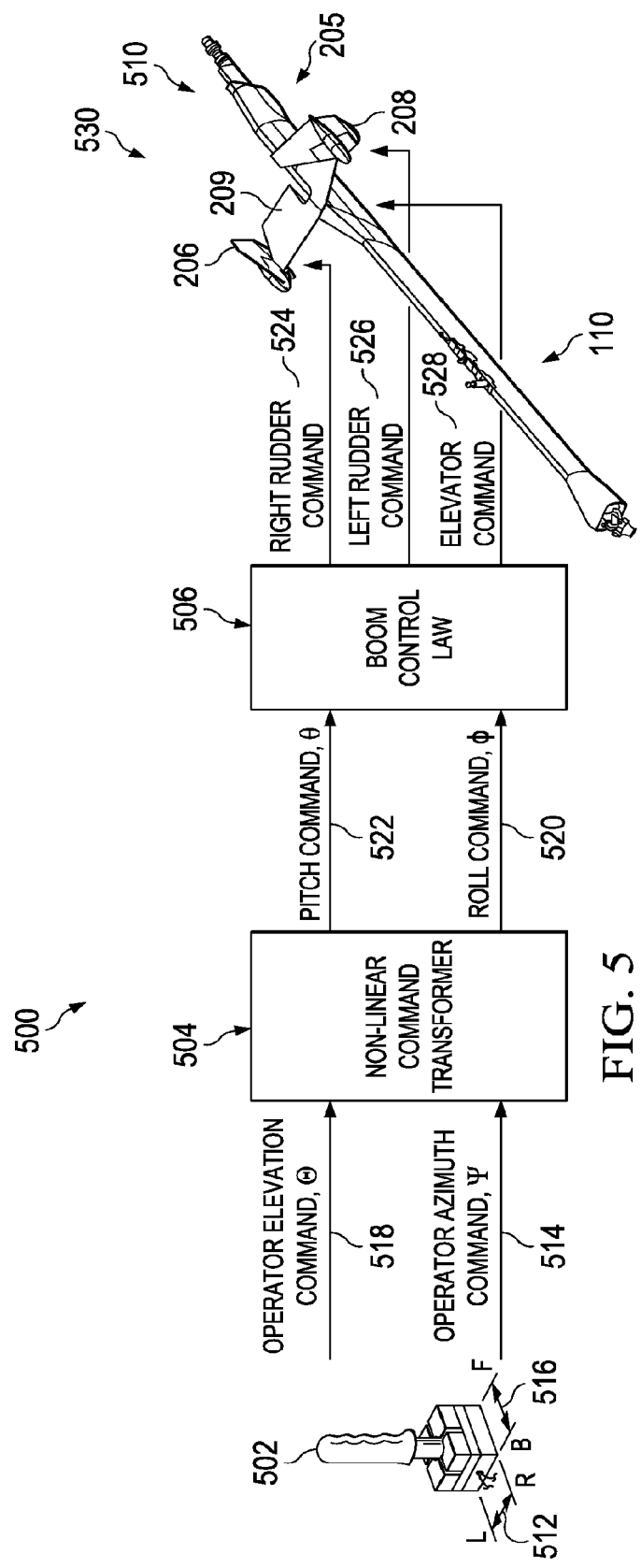
FIG. 5 is an illustration of a refueling system in accordance with an illustrative embodiment.

Turning now to FIG. 5, an illustration of a refueling system is depicted in accordance with an illustrative embodiment. Refueling system 500 is an example of one implementation for refueling system 437 in FIG. 4.

As depicted, refueling system 500 includes control stick 502, non-linear command transformer 504, boom control law 506, refueling boom 110, and force generation system 510. Control stick 502 is an example of a physical implementation for control stick 420 shown in block form in FIG. 4. Refueling boom 110 and force generation system 510 are examples of physical implementations for refueling boom 412 and force generation system 446 shown in block form in FIG. 4. Non-linear command transformer 504 is an example of command transformer 456 in FIG. 4.

In this illustrative example, movement of control stick 502 in first direction 512 is an example of left and right movement of control stick 502. This type of movement causes the generation of operator azimuth command ($\Psi$) 514. Movement of control stick 502 in second direction 516 is an example of forward and backward movement of control stick 502. This type of movement causes the generation of operator elevation command ($\Theta$) 518.

The movement of control stick 502 in first direction 512 and second direction 516 are examples of movement that corresponds more intuitively to movement of refueling boom 110. In particular, this movement is azimuth movement and elevation movement of refueling boom 110.

In this illustrative example, boom control law 506 interprets operator elevation command ($\Theta$) 518 and operator azimuth command 514 ($\Psi$) as pitch commands and roll commands resulting in pitch movement and roll movement instead. This type of movement of refueling boom 110 in response to movement of control stick 502 is not as intuitive as desired.

For example, when moving control stick 502 in the azimuth direction, the operator may expect refueling boom 110 to move directly in the azimuth direction corresponding to the movement of control stick 502. In other words, if the operator moves control stick 502 directly to the right, the operator may expect refueling boom 110 to move to that location. However, because of the kinematics of refueling boom 110, pitch commands and roll commands may be taken into account. As a result, the movement of refueling boom 110 using currently available systems is more complex than desired.

As an example, an operator may need to move the control stick in multiple directions to move refueling boom 110 to a desired location while taking into account the pitch and roll kinematics of the boom. Thus, with use of the illustrative embodiments, control stick commands may be automatically transformed to account for the kinematics of refueling boom 110. In other words, the movement of control stick 502 becomes more intuitive with the use of boom control law 506.

As depicted, boom control law 506 interprets these commands and transforms these commands to account for the kinematics of the support structure. In other words, the manner in which the refueling boom is moved may be a pitch movement and a roll movement rather than a similar movement to the movement of the control stick in an azimuth direction and/or an elevation direction.

In these illustrative examples, the desired movement for refueling boom 110 is an azimuth movement in response to movement of control stick 502 in first direction 512 and an elevation movement in response to movement of control stick 502 in second direction 516. This type of movement of refueling boom 110 in response to the movement of control stick 502 is a more intuitive and desirable type of movement.

Non-linear command transformer 504 is an example of an implementation of command transformer 456 in FIG. 4. Non-linear command transformer 504 makes the non-linear transformation of elevation and azimuth commands into pitch and roll commands. In this manner, non-linear command transformer 504 takes into account the kinematics of support system 444.

In these illustrative examples, non-linear command transformer 504 is configured to generate pitch commands and roll commands to provide the desired azimuth movement and elevation movement. In other words, non-linear command transformer 504 is configured to map elevation commands and azimuth commands into pitch commands and roll commands.

For example, when operator azimuth command ($\Psi$) 514 is received by non-linear command transformer 504, non-linear command transformer 504 is configured to generate roll command ($\phi$) 520 and pitch command ($\theta$) 522 in a manner that provides for azimuth movement without elevation movement. When operator elevation command ($\Theta$) 518 is received by non-linear command transformer 504, non-linear command transformer 504 generates roll command ($\phi$) 520 and pitch command ($\theta$) 522 in a manner that provides for elevation movement without azimuth movement as set out in operator elevation command ($\Theta$) 518.

Boom control law 506 is an example of a control law in control laws 432 in FIG. 4. Boom control law 506 is configured to receive pitch and roll commands such as pitch command ($\theta$) 522 and roll command ($\phi$) 520. In this illustrative example, boom control law 506 generates combinations of one or more of right rudder command 524, left rudder command 526, and elevator command 528. These commands are used to change the configuration of force generation system 510. In particular, the commands change the configuration of control surfaces 205 in force generation system 510, which include rudder 206, rudder 208, and elevator 209.

The change in the configuration of control surfaces 205 in force generation system 510 results in a movement of refueling boom 110 in the azimuth direction in response to operator azimuth command 514 (Ψ) generated by movement of control stick 502 in first direction 512 instead of a roll movement. Additionally, the change in the configuration of control surfaces 205 in force generation system 510 results in elevation movement of refueling boom 110 in response to operator elevation command (Θ) 518 generated in response to movement of control stick 502 in second direction 516 instead of a pitch movement.

Thus, non-linear command transformer 504 provides a mapping of operator elevation commands and operator azimuth commands in a manner that generates pitch commands and roll commands that cause refueling boom 110 to move in an elevation direction or an azimuth direction. This type of movement of refueling boom 110 in response to the movements described for control stick 502 are considered corresponding movements. In other words, the movement of control stick 502 in first direction 512 results in a movement of refueling boom 110 that corresponds to the movement of control stick 502. The movement of refueling boom 110 is an azimuth movement. Thus, the movement of refueling boom 110 in response to movement of control stick 502 is more intuitive.

Further, a similar movement of control stick 502 in second direction 516 results in a corresponding movement of refueling boom 110. In other words, the movement of control stick 502 in first direction 512 and second direction 516 are linear movements. The movements of refueling boom 110 are corresponding movements that are also linear movements in these illustrative examples.

Turning now to FIG. 6, an illustration of a graph of a refueling boom envelope is depicted in accordance with an illustrative embodiment. In this illustrative example, graph 600 is a graph of boom envelope 602. X-axis 604 represents azimuth, and Y-axis 606 represents elevation. Line 608 represents the mechanical limits of boom envelope 602. Line 610 represents limits based on control laws.

In this illustrative example, operator azimuth command (Ψ) 514 in FIG. 5 results in a roll movement as indicated by line 612. Operator elevation command (Θ) 518 in FIG. 5 results in a pitching movement as indicated by line 614. As can be seen, line 612 corresponding to the roll movement indicates movement in the azimuth direction and elevation direction. This movement is generated in response to operator azimuth command (Ψ) 514 when non-linear command transformer 504 in FIG. 5 is not used.

In other words, boom control law 506 in FIG. 5 interprets operator azimuth command (Ψ) 514 generated by movement in first direction 512 in FIG. 5 as a roll command rather than an azimuth command. Movement in second direction 516 generates operator elevation command (Θ) 518 in FIG. 5 which is interpreted as a pitch command rather than elevation command.

In particular, movement of control stick 502 in a line in first direction 512 does not result in the same type of movement of refueling boom 110 in FIG. 5 as shown by line 612. Thus, the movement of control stick 502 does not result in corresponding movement of refueling boom 110 when that command is interpreted directly by boom control law 506 without the use of non-linear command transformer 504 in FIG. 5.

This type of command system using boom control law 506 without non-linear command transformer 504 is less intuitive because movement of refueling boom 110 does not substantially correspond to movement of control stick 502 in FIG. 5. As a result, more adjustments may need to be made by operator 416 in the manner in which control stick 502 is moved to cause refueling boom move to the desired location.

Turning now to FIG. 7, an illustration of a graph of a refueling boom envelope is depicted in accordance with an illustrative embodiment. In this illustrative example, graph 700 is a graph of boom envelope 702. X-axis 704 represents azimuth and Y-axis 706 represents elevation. Line 708 represents the mechanical limits of boom envelope 702. Line 710 represents limits based on control laws.

In this illustrative example, operator azimuth command (Ψ) 514 in FIG. 5 results in movement as indicated by line 712. As can be seen, this movement is only in the azimuth direction and not the elevation direction as compared to movement indicated by line 612 in FIG. 6. This movement substantially corresponds to the movement of control stick 502 in FIG. 5. In other words, movement of control stick 502 in first direction 512 results in movement of refueling boom 110 in FIG. 5 as indicated by line 712 instead of line 612 in FIG. 6.

In a similar fashion, operator elevation command (Θ) 518 in FIG. 5 results in movement of refueling boom 110 as indicated by line 714. The movement in line 714 is only in the elevation direction and does not include movement in the azimuth direction. This movement occurs instead of the movement indicated by line 614 in FIG. 6 when non-linear command transformer 504 is not used.

Thus, movement of control stick 502 in a line results in a similar movement of refueling boom 110. When control stick 502 is moved in first direction 512, refueling boom 110 only moves in the azimuth direction and not in the elevation direction.

The illustration of refueling system 500 in FIG. 5 and the graphs of refueling boom envelopes in FIG. 6 and FIG. 7 for refueling system 500 are only some examples of an implementation for refueling system 437 in FIG. 4. These illustrations and graphs are not meant to imply limitations to other implementations of refueling system 437 in FIG. 4. For example, although refueling system 500 employs non-linear command transformer 504 in FIG. 5, other implementations may use a linear command transformer. Thus, the transformation provided in different command transformers in different refueling systems may be selected from at least one of a linear transformation and a non-linear transformation.

Figure 8:
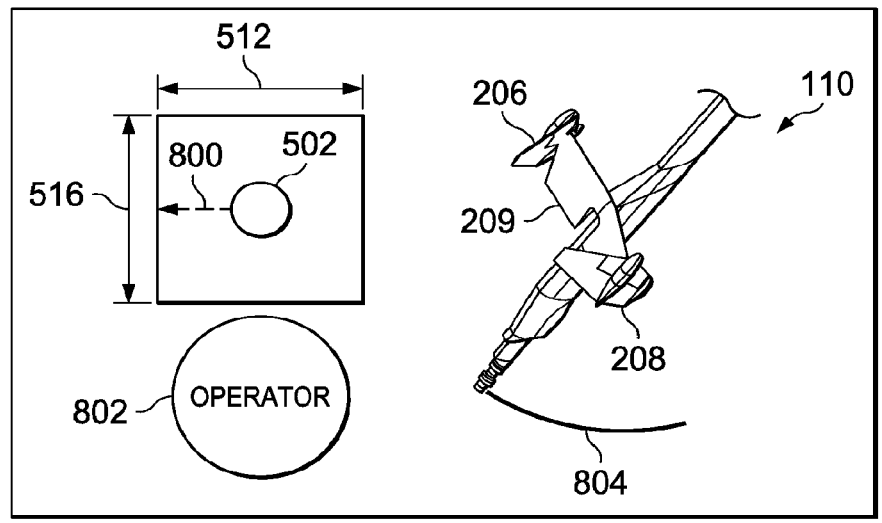
FIG. 8 is an illustration of the movement of a refueling boom in response to the movement of a control stick in accordance with an illustrative embodiment.

Turning now to FIG. 8, an illustration of the movement of a refueling boom in response to the movement of a control stick is depicted in accordance with an illustrative embodiment. The movement of refueling boom 110 in FIG. 1 occurs with the use of a command transformer.

As depicted, control stick 502 is moved in the direction of arrow 800. Arrow 800 is in first direction 512. In particular, arrow 800 represents a movement to the left relative to operator 802. When operating refueling boom 110, operator 802 faces the rear of the aircraft in these illustrative examples. Thus, movement to the left relative to operator 802 results in movement of refueling boom 110 in a direction toward the right wing of the tanker aircraft, such as tanker aircraft 106 in FIG. 1.

As can be seen, this movement of control stick 502 in the direction of arrow 800 causes movement of refueling boom 110 as indicated by line 804. As can be seen, line 804 shows a roll movement of refueling boom 110.

This movement is not the desired movement of refueling boom 110 when operator 802 moves control stick 502 in the direction of arrow 800. Line 804 indicates movement in both elevation and azimuth, which is undesirable based on the movement of control stick 502 in the direction of arrow 800.

Figure 9:
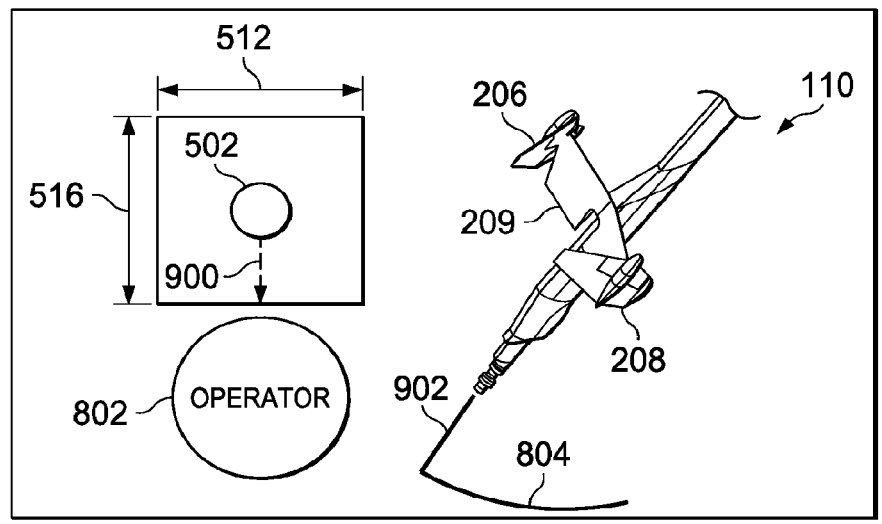
FIG. 9 is another illustration of the movement of a refueling boom in response to the movement of a control stick in accordance with an illustrative embodiment.

Turning now to FIG. 9, another illustration of the movement of a refueling boom in response to the movement of a control stick is depicted in accordance with an illustrative embodiment. The movement of refueling boom 110 occurs with the use of a command transformer.

After being moved in the direction of arrow 800 in FIG. 8, control stick 502 is now moved in the direction of arrow 900. Arrow 900 is in second direction 516 which is substantially perpendicular to first direction 512. In this example, arrow 900 is a backward movement relative to operator 802. Because operator 802 faces the rear of the aircraft when operating refueling boom 110, movement of control stick 502 in the direction of arrow 900 results in movement of refueling boom 110 toward the fuselage of the tanker aircraft.

This movement of control stick 502, however, results in the movement of refueling boom 110 as indicated by line 902. This movement is a pitch movement which includes movement in both an azimuth and elevation direction. This type of movement is undesirable with respect to the movement of control stick 502 in the direction of arrow 900 in this particular example.

Figure 10:
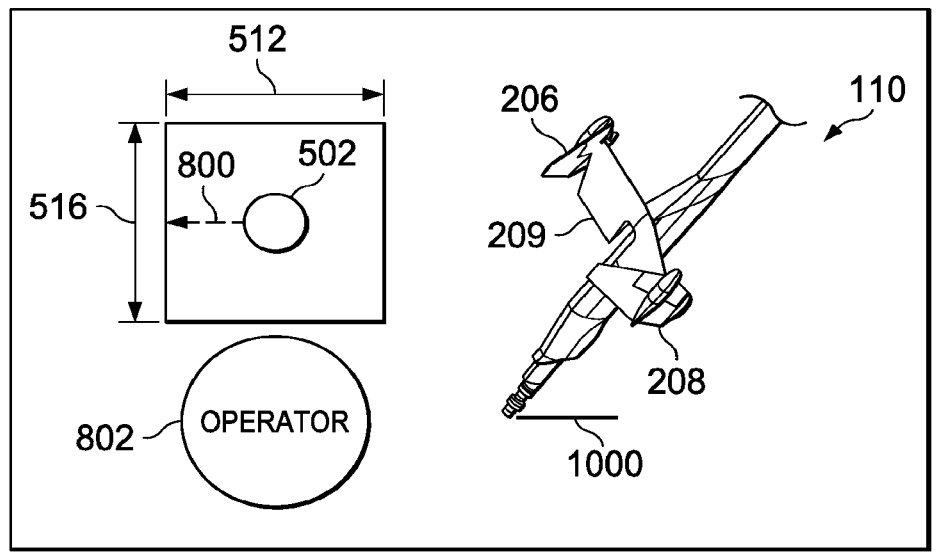
FIG. 10 is another illustration of the movement of a refueling boom in response to the movement of a control stick using a command transformer in accordance with an illustrative embodiment.

Turning now to FIG. 10, another illustration of the movement of a refueling boom in response to the movement of a control stick using a command transformer is depicted in accordance with an illustrative embodiment. In this example, control stick 502 is again moved in the direction of arrow 800.

However, when a command transformer is used in the refueling controller, refueling boom moves in the direction as indicated by line 1000. Line 1000 indicates the refueling boom moves in a substantially azimuth direction and not in an elevation direction. This type of movement corresponds to the movement of control stick 502 in the direction of arrow 800.

Figure 11:
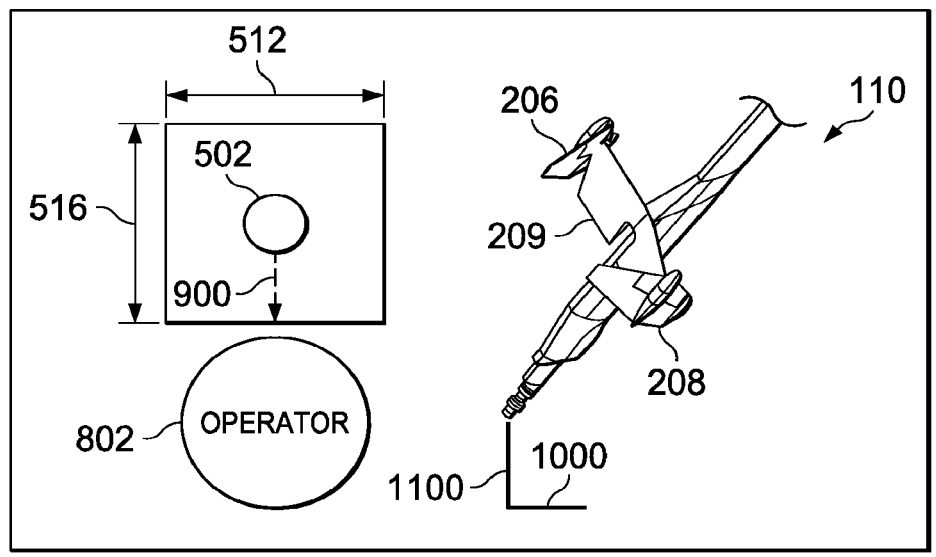
FIG. 11 is another illustration of the movement of a refueling boom in response to the movement of a control stick using a command transformer in accordance with an illustrative embodiment.

Turning now to FIG. 11, another illustration of the movement of a refueling boom in response to the movement of a control stick using a command transformer is depicted in accordance with an illustrative embodiment. In this example, control stick 502 is moved in the direction of arrow 900. This backward movement of control stick 502 in the direction of arrow 900 results in refueling boom 110 moving along line 1100.

In this illustrative example, line 1100 is substantially in an elevation direction and not in an azimuth direction. This movement corresponds to the movement of control stick 502 in the direction of arrow 900.

The illustration of the movement of refueling boom 110 in FIGS. 8-11 are only examples of some types of movement that may occur. For example, a movement of control stick 502 in a diagonal direction to first direction 512 and second direction 516 may result in an elevation and pitch movement in the same corresponding manner of refueling boom 110. Other movements such as moving control stick 502 to the left or backward may result in azimuth movement or elevation movement as desired, rather than movement that may include rolling and pitching without the use of a command transformer.

The different components shown in FIGS. 1-3, 5, and 8-11 may be combined with components in FIG. 2 and FIG. 4, used with components in FIG. 2 and FIG. 4, or a combination of the two. Additionally, some of the components in FIG. 1 and FIG. 2 may be illustrative examples of how components shown in block form in FIG. 2 and FIG. 4 can be implemented as physical structures.

Figure 12:
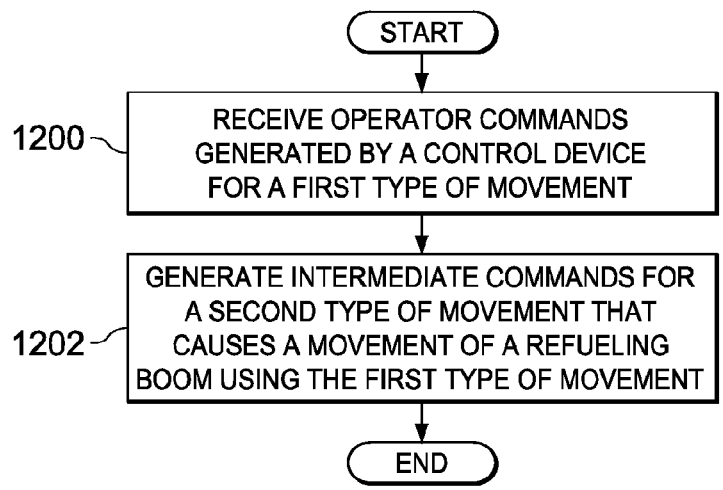
FIG. 12 is an illustration of a flowchart of a process for moving refueling boom on a tanker aircraft in accordance with an illustrative embodiment.

Turning now to FIG. 12, an illustration of a flowchart of a process for moving a refueling boom on a tanker aircraft is depicted in accordance with an illustrative embodiment. The process illustrated in FIG. 12 may be implemented in tanker aircraft 408 in FIG. 4. In particular, this process may be implemented using refueling system 437 in FIG. 4.

The process begins by receiving operator commands generated by a control device for a first type of movement (operation 1200). The operator commands are for the first type of movement of the refueling boom. This first type of movement may be, for example, movement in an azimuth direction and an elevation direction.

The process generates intermediate commands for a second type of movement that causes a movement of a refueling boom using the first type of movement (operation 1202) with the process terminating thereafter. This second type of movement may be, for example, movement in a roll direction and a pitch direction. These intermediate commands are commands such as roll and pitch commands that result in the desired azimuth and elevation movement as indicated by the operator commands that are in the form of azimuth commands and elevation commands.

Figure 13:
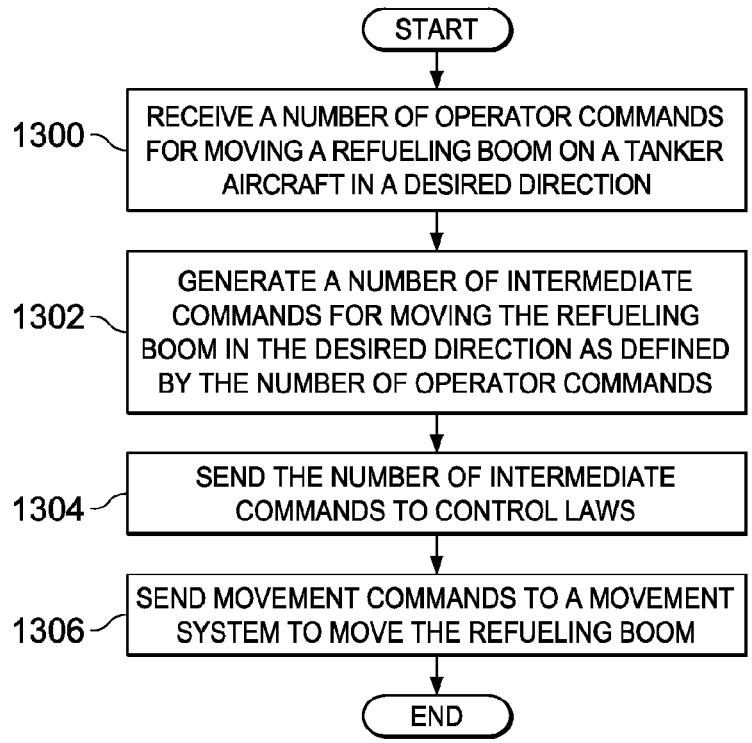
FIG. 13 is an illustration of a flowchart of a process for moving a refueling boom on a tanker aircraft in accordance with an illustrative embodiment.

Turning now to FIG. 13, an illustration of a flowchart of a process for moving a refueling boom on a tanker aircraft is depicted in accordance with an illustrative embodiment. The process illustrated in FIG. 13 may be implemented in refueling system 437 in FIG. 4.

The process begins by receiving a number of operator commands for moving a refueling boom on a tanker aircraft in a desired direction (operation 1300). These operator commands define at least one of an azimuth movement and an elevation movement of the refueling boom during flight of the tanker aircraft.

The process generates a number of intermediate commands for moving the refueling boom in the desired direction as defined by the number of operator commands (operation 1302). The process then sends the number of intermediate commands to control laws (operation 1304). In response, movement commands are sent to a movement system to move the refueling boom (operation 1306) with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
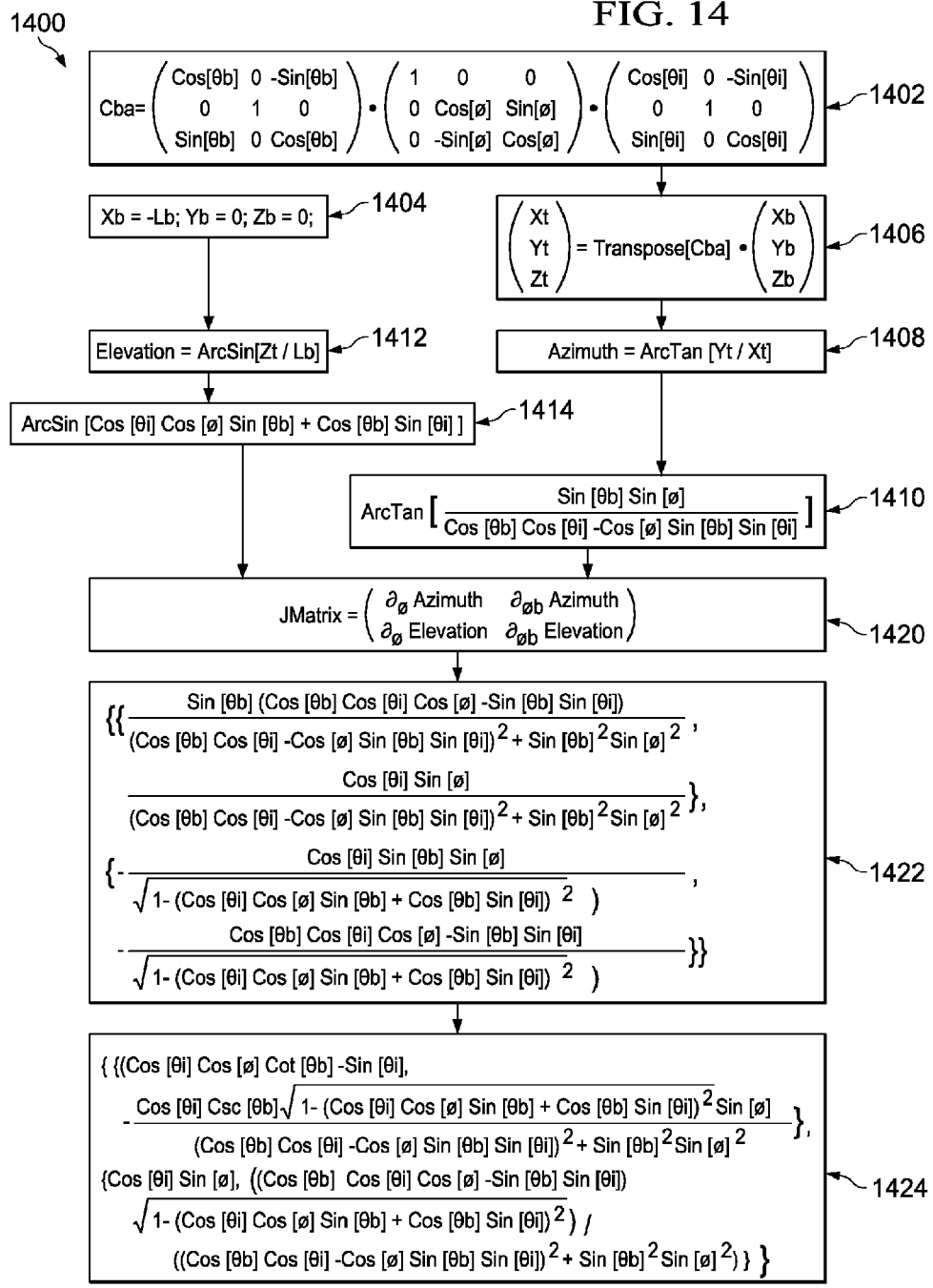
FIG. 14 is an illustration of an equation flow for obtaining a Jacobian inverse matrix for use in generating roll and pitch commands from azimuth and elevation commands in accordance with an illustrative embodiment.

Turning now to FIG. 14, an illustration of an equation flow for obtaining a Jacobian inverse matrix for use in generating roll and pitch commands from azimuth and elevation commands is depicted in accordance with an illustrative embodiment. Equation flow 1400 is a diagram of equations used to derive a Jacobian inverse matrix for use in command transformer 456 in FIG. 4.

For example, command transformer 456 may provide a refueling boom to aircraft transformation. In other words, command transformer 456 may provide for a mapping from the rotating type of movement of the aircraft to more linear movement provided using boom coordinates. For example, roll movement and pitch movement may be mapped to azimuth movement and elevation movement.

In one illustrative example, this transformation may be provided by using transformation equation 1402. In transformation equation 1402, Cba is the rotation from the aircraft transformed to boom coordinates, $\theta b$ is the pitch angle of the refueling boom, $\phi$ is the roll axis, and $\theta i$ is the pitch angle of the rolling gimbal point. In these illustrative examples, the rolling gimbal point is the point about which the gimbal provides movement. Pitching gimbal point 307 and pitching gimbal point 309 in FIG. 3 are examples of pitching gimbal points.

The boom tip location may be identified using equation 1404 and equation 1406. These two equations identify a coordinate system for the boom. In these two equations, Xb, Yb, and Zb are coordinates of the tip of the refueling boom. Xt, Yt, Zt are the transposed coordinates using the transposed function as indicated in equation 1406.

Equation 1404 and equation 1406 assume the origin is at a boom pivot, such as rolling gimbal point 307 in FIG. 3. A positive value of X in these examples is in a direction from the rolling gimbal point toward the nose of the tanker aircraft. A negative value of X is in a direction from the rolling gimbal point toward the end of the boom.

A positive value for Y is in a direction from the rolling gimbal point outward from the right wing of the aircraft. A negative value for Y is in a direction from the rolling gimbal point outward from the left wing of the aircraft. A positive value of Z is in a direction from the rolling gimbal point downward from the aircraft and a negative value of Z is in direction from rolling gimbal point upward from the aircraft.

The azimuth angle for the refueling boom may be defined using equation 1408. Thus, the azimuth angle may be represented as equation 1410.

The elevation angle is defined using equation 1412. In this example, the elevation angle may also be represented using 1414. Equation 1410 and equation 1414 may be used in equation 1420. Equation 1420 is a Jacobian matrix in these illustrative examples.

A Jacobian matrix is illustrated in equation 1420. When the azimuth and elevation are expanded to take the partial derivatives of azimuth angle in equation 1410 and elevation angle in equation 1414, Jacobian matrix 1422 results. An inverse of Jacobian matrix 1422 results in inverse Jacobian matrix 1424. Inverse Jacobian matrix 1424 is one illustrative example of an equation that may be used in command transformer 456 to provide a mapping of commands for azimuth movement and elevation movement into commands for roll movement and pitch movement that results in the desired azimuth movement and elevation movement.

Figure 15:
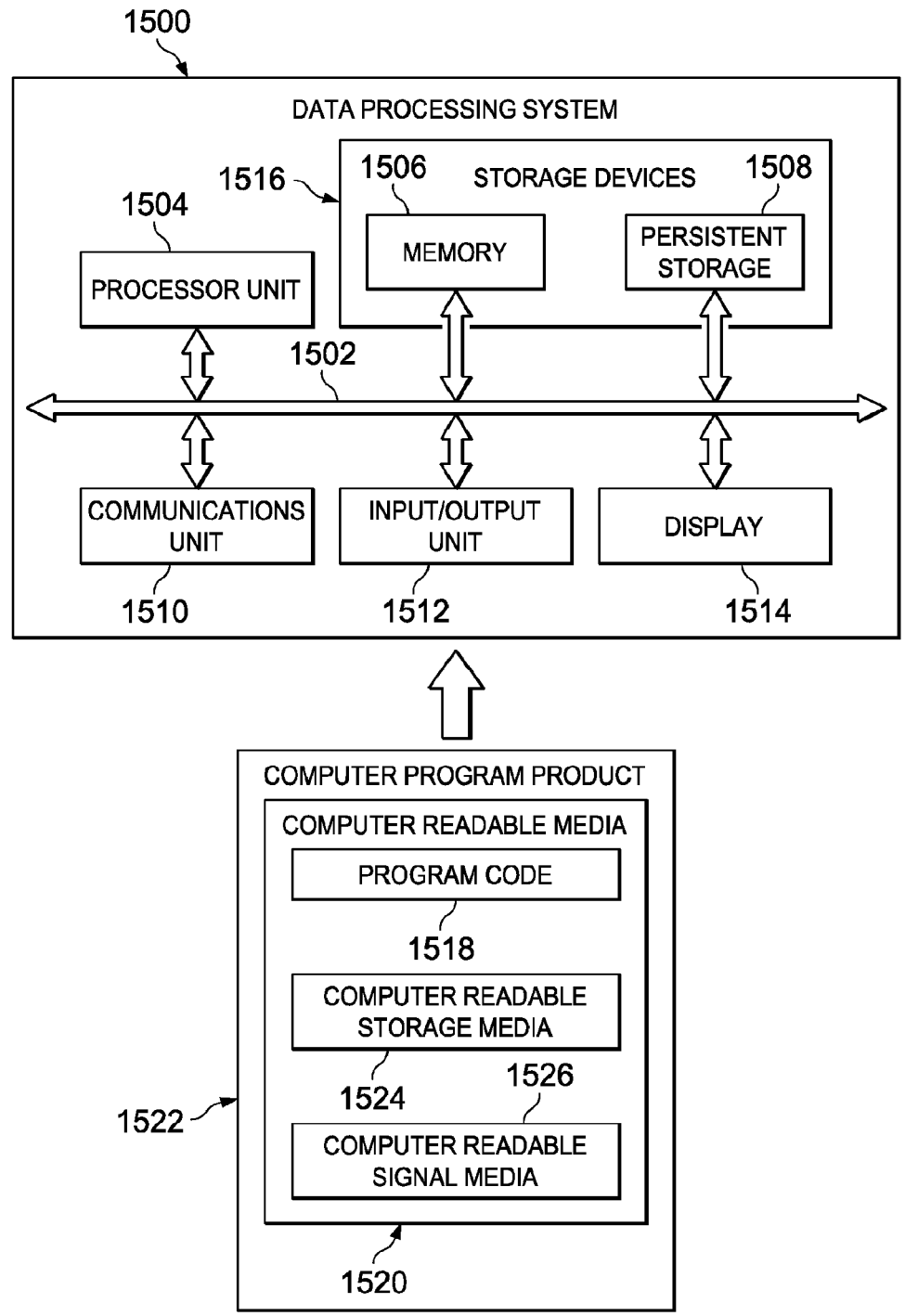
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement one or more computers in computer system 428 in tanker aircraft 408 in FIG. 4.

In this illustrative example, data processing system 1500 includes communications framework 1502, which provides communications between processor unit 1504, memory 1506, persistent storage 1508, communications unit 1510, input/output unit 1512, and display 1514. In this example, communication framework may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526.

In these illustrative examples, computer readable storage media 1524 is a physical or tangible storage device used to store program code 1518 rather than a medium that propagates or transmits program code 1518.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1500 are not meant to provide architectural limitations to the manner in which different embodiments may be implemented. The different illustrative embodiments may be implemented in a data processing system including components in addition to and/or in place of those illustrated for data processing system 1500. Other components shown in FIG. 15 can be varied from the illustrative examples shown. The different embodiments may be implemented using any hardware device or system capable of running program code 1518.

Figure 16:
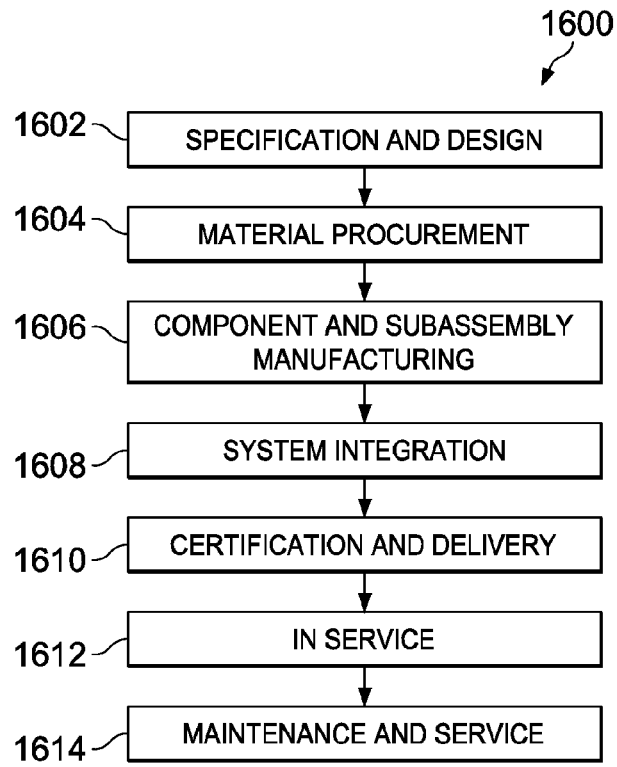
FIG. 16 is an illustration of an aircraft manufacturing and service method in accordance with an illustrative embodiment.
Figure 17:
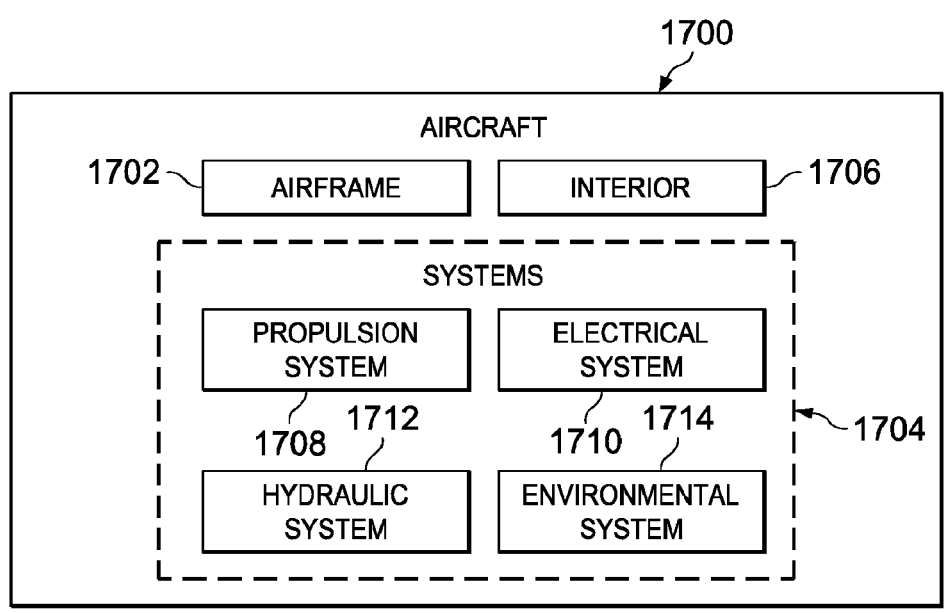
FIG. 17 is an illustration of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. Aircraft 1700 may be one example of aircraft 102 and aircraft 104 shown in FIG. 1.

In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included.

Apparatuses and methods embodied herein may be employed during at least one of the stages of aircraft manufacturing and service method 1600 in FIG. 16. For example, one or more illustrative embodiments may be implemented to develop aircraft 1700 during specification and design 1602. In another illustrative example, command transformer 456 in FIG. 4 may be included in aircraft 1700 during system integration 1608. For example, hardware, software, or both hardware and software for command transformer 456 may be implemented in aircraft 1700 during the assembly of aircraft 1700 in system integration 1608. Further, command transformer 456 in FIG. 4 also may be included in aircraft 1700 during maintenance and service 1614 as a modification, an upgrade, or a refurbishment of aircraft 1700.

Thus, the illustrative embodiments provide a method and apparatus for moving a refueling boom. In particular, one or more illustrative embodiments may provide a capability to generate commands to move a refueling boom in directions that correspond to direction of movement of a control stick. For example, if a control stick is moved in a first direction for an azimuth direction, the command transformer generates appropriate commands such that the control laws in the refueling controller generate commands to the refueling boom unit that moves the refueling boom in an azimuth direction rather than some other type of movement.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a refueling controller configured to receive a number of operator commands for moving a refueling boom on a tanker aircraft in a desired direction, wherein the number of operator commands defines at least one of an azimuth movement and an elevation movement of the refueling boom during flight of the tanker aircraft, generate a number of intermediate commands for moving the refueling boom in the desired direction as defined by the number of operator commands, and include an operator azimuth command and an operator elevation command, and are generated by movement of a control device, wherein the number of intermediate commands defines at least one of a roll movement and a pitch movement such that the refueling boom moves in the desired direction, and wherein the roll movement and the pitch movement result in substantially linear azimuth movement of the refueling boom from the operator azimuth command and substantially linear elevation movement of the refueling boom from the operator elevation command.

2. The apparatus of claim 1, wherein the number of operator commands is generated by the movement of the control device by an operator in a first direction that corresponds to the azimuth movement and in a second direction that corresponds to the elevation movement for the refueling boom.

3. The apparatus of claim 2, wherein the control device is a control stick.

4. The apparatus of claim 1, wherein a command transformer in the refueling controller is configured to receive the number of operator commands for moving the refueling boom on the tanker aircraft in the desired direction, wherein the number of operator commands defines at least one of the azimuth movement and the elevation movement of the refueling boom during flight of the tanker aircraft and generate the number of intermediate commands for moving the refueling boom in the desired direction as defined by the number of operator commands, wherein the number of intermediate commands defines at least one of the roll movement and the pitch movement such that the refueling boom moves in the desired direction.

5. The apparatus of claim 1 further comprising:
a number of control laws, wherein the number of control laws is configured to process the number of intermediate commands to cause movement of the refueling boom using at least one of the roll movement and the pitch movement that results in at least one of the azimuth movement and the elevation movement.

6. The apparatus of claim 5, wherein the number of control laws is configured to generate movement commands and send the movement commands to a force generation system.

7. The apparatus of claim 6, wherein the force generation system is comprised of control surfaces.

8. The apparatus of claim 1, wherein the refueling controller is configured to perform a transformation of the number of operator commands to the number of intermediate commands, wherein the transformation is selected from at least one of a linear transformation and a non-linear transformation.

9. The apparatus of claim 8, wherein the transformation is performed using an inverse Jacobian matrix.

10. The apparatus of claim 1, wherein the desired direction comprises one or more of an azimuth direction, an elevation direction, and a telescopic direction.

11. An apparatus comprising:
a refueling controller configured to receive a number of operator commands for moving a refueling boom on a tanker aircraft in a desired direction, wherein the number of operator commands defines at least one of an azimuth movement and an elevation movement of the refueling boom during flight of the tanker aircraft and generate a number of intermediate commands for moving the refueling boom in the desired direction as defined by the number of operator commands, wherein the number of operator commands include an operator azimuth command and an operator elevation command, wherein the number of intermediate commands defines at least one of a roll movement and a pitch movement such that the refueling boom moves in the desired direction, and wherein the roll movement and the pitch movement result in substantially linear azimuth movement of the refueling boom from the operator azimuth command and substantially linear elevation movement of the refueling boom from the operator elevation command.

12. The apparatus of claim 11, wherein the number of operator commands is generated by movement of a control device by an operator in a first direction that corresponds to the azimuth movement and in a second direction that corresponds to the elevation movement for the refueling boom.

13. The apparatus of claim 12, wherein the control device is a control stick.

14. The apparatus of claim 11, wherein a command transformer in the refueling controller is configured to receive the number of operator commands for moving the refueling boom on the tanker aircraft in the desired direction, wherein the number of operator commands defines at least one of the azimuth movement and the elevation movement of the refueling boom during flight of the tanker aircraft and generate the number of intermediate commands for moving the refueling boom in the desired direction as defined by the number of operator commands, wherein the number of intermediate commands defines at least one of the roll movement and the pitch movement such that the refueling boom moves in the desired direction.

15. The apparatus of claim 11 further comprising:
a number of control laws, wherein the number of control laws is configured to process the number of intermediate commands to cause movement of the refueling boom using at least one of the roll movement and the pitch movement that results in at least one of the azimuth movement and the elevation movement.

16. The apparatus of claim 15, wherein the number of control laws is configured to generate movement commands and send the movement commands to a force generation system.

17. An apparatus comprising:
a refueling controller configured to receive a number of operator commands for moving a refueling boom on a tanker aircraft in a desired direction, wherein the number of operator commands are generated by a control stick, wherein the number of operator commands defines at least one of an azimuth movement and an elevation movement of the refueling boom during flight of the tanker aircraft and generate a number of intermediate commands for moving the refueling boom in the desired direction as defined by the number of operator commands, wherein the number of operator commands include an operator azimuth command and an operator elevation command, wherein the number of intermediate commands defines at least one of a roll movement and a pitch movement such that the refueling boom moves in the desired direction and wherein the roll movement and the pitch movement result in substantially linear azimuth movement of the refueling boom from the operator azimuth command and substantially linear elevation movement of the refueling boom from the operator elevation command.

18. The apparatus of claim 17, wherein an operator moves the control stick in a first direction that corresponds to the azimuth movement and in a second direction that corresponds to the elevation movement for the refueling boom.

19. The apparatus of claim 18, wherein the refueling controller is configured to perform a transformation of the number of operator commands to the number of intermediate commands, wherein the transformation is selected from at least one of a linear transformation and a non-linear transformation.

20. The apparatus of claim 19, wherein the transformation is performed using an inverse Jacobian matrix.

* * * * *